United States Patent [19]

Brugger

[11] 4,191,727

[45] Mar. 4, 1980

[54] METHOD FOR THE SEPARATION OF A MIXTURE OF FINE PARTICLES

[75] Inventor: Wilhelm Brugger, Hösel, Fed. Rep. of Germany

[73] Assignee: Th. Goldschmidt AG, Essen, Fed. Rep. of Germany

[21] Appl. No.: 908,107

[22] Filed: May 22, 1978

[30] Foreign Application Priority Data

Jun. 11, 1977 [DE] Fed. Rep. of Germany ....... 2726419

[51] Int. Cl.[2] ...................... C22B 59/00; C01F 17/00; C01G 56/00; B01D 11/00

[52] U.S. Cl. .......................................... 423/1; 423/11; 423/21.1; 423/658.5; 209/9

[58] Field of Search .............. 423/1, 21, 80, 82, 658.5, 423/DIG. 19, 11, 12; 209/9

[56] References Cited

U.S. PATENT DOCUMENTS

| | | | |
|---|---|---|---|
| 2,459,967 | 1/1949 | Schilling | 209/9 |
| 3,480,139 | 11/1969 | Fricke et al. | 209/9 |

*Primary Examiner*—O. R. Vertiz

*Attorney, Agent, or Firm*—Toren, McGeady and Stanger

[57] ABSTRACT

A method for the separation of a mixture of fine particles wherein the fraction to be separated has a surface which is more reactive chemically than the remaining fractions by grinding the mixture so that the fraction to be separated has a particle size of less than 50μ, suspending the ground mixture at a temperature less than 100° C. in a diluted aqueous solution of zirconium oxychloride or zirconium oxynitrate, allowing the solution to settle and decanting the deposited material and then adding a base to the decantate to precipitate the residue therein. This process allows selective separation of the fractions having a more chemically reactive surface without the use of complex equipment and with a minimum use of expensive additives and chemicals.

10 Claims, No Drawings

METHOD FOR THE SEPARATION OF A MIXTURE OF FINE PARTICLES

BACKGROUND OF THE INVENTION

1. Field of the Invention

The invention relates to a method for the separation of a mixture of fine particles which are insoluble in water. More particularly, the invention relates to the separation of a mixture of particles of a mineral, wherein the fraction to be separated has a chemically more reactive surface than the remaining fraction or fractions.

2. Description of the Prior Art

In chemical processes and experiments, it often becomes necessary to remove certain portions from a mixture of fine particles. The need for such a separation often arises because these portions interfere with the further physical and/or chemical treatment of the mixture, with its later useability or the mixture contains a fraction whose separation and obtaining in pure form is of significant economic interest. This problem exists particularly in the preparation of minerals which frequently contain portions which must be separated for the above-mentioned reasons in relatively small amounts.

SUMMARY OF THE INVENTION

The present invention provides a method which is suitable for selectively separating one or more fractions from a mixture of fine particles which are insoluble in water. More particularly, the present method facilitates this separation with a minimum use of chemicals and avoids the use of special elaborate apparatuses or costly equipment or material.

Specifically, I have discovered that these results may be achieved by grinding the mixture until the fraction to be separated has a particle size of less than 50 $\mu$, suspending the ground material at a temperature below 100° C. in a diluted aqueous solution of zirconium oxychloride or zirconium oxynitrate which, relative to the fraction to be separated, contains 0.3 to 3% by weight of the zirconium compound and then decanting the liquid. If necessary, the suspending and decanting steps may be repeated and, if necessary, the deleted or stripped fraction is washed out and dried. The suspension obtained by the decantation is precipitated by the addition of a base, preferably, ammonia, the precipitate is filtered and, if necessary, the residue is washed and dried.

DESCRIPTION OF THE PREFERRED EMBODIMENT

The zirconium compound used in the present invention may contain from about 1 to 3% by weight hafnium. The term "chemically more reactive surfaces" is intended to mean a reactivity relative to the basic zirconyl ions present in the diluted aqueous solution. Such reactive areas in the surface of a fraction to be separated are, for example, hydroxyl groups of basic phosphates, hydrated oxides or basic carbonate groups.

In the case of a primary mineral, a chemically defined mineral constituent can form these reactive groups in the process of obtaining the mineral, for example, by treatment with acid during the grinding in the presence of water or also, later in the aqueous solution of the zirconium oxychloride or the zirconium oxynitrate. The reactive surfaces can be present in a secondary mineral, which is a mineral which had already been subjected to attack by atmospheric moisture.

The problem of separation exists also in the purification, for example, of finely ground natural baddeleyite. In the production of electrical ceramics, for example, of lead zirconate titanite, or blue or yellow pigments based on zirconium orthosilicate, the hydroxide groups interfere with the solid state reaction. Hydroxide groups combined with phosphate groups are especially persistently retained at the sintering temperatures applicable in this case. These impurities containing the phosphate form, at a sufficient fineness of grinding, a stable suspension with a highly diluted solution of zirconium oxychloride and thus, they can be separated from the sedimented, purified final product.

One possible explanation as to the efficiency of the present method is that the zirconium oxychloride or the zirconium oxynitrate hydrolyze in the diluted, aqueous solution resulting in the formation of the zirconyl ion $ZrOOH^{+} \cdot n\ H_2O$. A portion of these zirconyl ions forms aggregates with each other having ion weights of up to approximately 8000. These aggregates do not constitute stable polymers, since they are able to adjust, in respect to their degree of polymerization, to the properties of the aqueous medium. Both the degree of aggregation and the hydrate sheath or cover vary corresponding to the outside conditions, such as, for example, ph-value, temperature, concentration. Therefore, in the inventive method, a temperature of 100° C. should not be exceeded since, due to the decomposition of the hydrate sheath, the hydrated zirconyl oxide (or zirconyl hydroxide) precipitates and converts into a gel-like state which is crystalline above 150° C.

Furthermore, care must be taken that a pH-value of 6 is not exceeded in the aqueous suspension, since otherwise, an irreversible partial precipitation of the hydrated zirconyl oxide would occur. The two above-mentioned conditions pose no problems since, in the absence of external constraints, the most economical manner of operation, i. e., an operation at room temperature, will be preferred. If in an exceptional case, the mixture becomes alkaline due to the reaction, the pH value can be adjusted to 2 to 6 by an addition of the appropriate amount of acid. In this case, the acid which corresponds to ionic part of the zirconium salt is preferred. If, as it is usually the case, a mixture is used having a neutral reaction in an aqueous suspension, this pH value is self-adjusting by the hydrolysis of the zirconium compound used. If necessary, in the case that only very small amounts of the zirconium compound are used, the pH value can be reduced by additional additions of the corresponding acid in appropriate amounts.

It is suspected that there is a reciprocal action between the basic zirconyl ions and the chemically more reactive constituents of the mixture. This reciprocal action may vary from a chemosorption to a chemical combination. This addition of the basic zirconyl ions acts in a manner similar to the addition of components which are active at the interface to dirt particles and results in the separation of these aggregates from the mixture. As a result, a suspension is formed whose stability is so great that the chemically more reactive fraction is completely removed from the mixture by the decantation process which can be repeated, if desired.

It is apparent that a stable suspension is only formed if the suspending force of the basic zirconyl ions is able to counteract the tendency of the particles to form sediment. Therefore, it is necessary that the chemically more reactive component which is to be removed does not exceed an upper limit in particle size. This particle size is approximately 50 μ. If the fraction to be separated has a relatively high specific weight, a higher degree of grinding will be used. It became apparent that a particle size of less than 20 μ is particularly advantageous.

The suspension obtained in the inventive method is decanted. If necessary, another treatment with a diluted, aqueous solution of zirconium oxychloride or zirconium oxynitrate follows. After decantation, the deleted mixture is advantageously washed out and dried before it is used.

In accordance with the present invention, the decanted suspension or the combined decanted suspensions are prepared by adding a base, for instance alkali hydroxide or, particularly, ammonia, so that the neutral point of the suspension is exceeded. In doing so, the hydrated zirconium oxide is precipitated and the suspension breaks up. The deposit can now be washed and dried after the supernatant solution has been poured off or after filtering and, subsequently, can be subjected to further treatment.

The amount of zirconium salt required in the inventive method is extraordinarily small, since it is not necessary to use it in a stoichiometric amount relative to the fraction to be separated. Small additions of zirconium compound are sufficient, usually significantly below 1% by weight relative to the fraction to be separated, in order to ensure a complete or very extensive separation of the fraction to be separated.

The inventive method has many versatile applications. For example, it can be used for the separation of the compounds of the rare earths from the magnetite of Mount Pilanes (West Transvaal). In the above-mentioned manner, it is possible to separate the rare earth compounds from the magnetite. Simultaneously, the fraction containing thorium is separated which would then make industrial use of the magnetite possible.

As shown in DT-PS 1 592 423, it is known to prepare baddeleyite by treating it with acid. If the inventive method is utilized for a baddeleyite treated in such a manner, that fraction of the baddeleyite which is chemically attacked is removed and a black fraction of the essentially unchanged natural baddeleyite remains. Particularly, in respect to the further treatment, these two fractions have different properties. The pure black fraction of the baddeleyite is particularly suitable for those processes in which a solid state reaction takes place, for example, in the production of zirconium metal powder and in the production of various alkaline earth zirconates or lead zirconates which, due to their dielectric or piezoelectric properties, are of great importance. The separated gray fraction of the baddeleyite is particularly suitable for the production of adsorptive coloring substances.

DT-PS 2 051 299 discloses a method for separating radioactive admixtures from zirconium oxide obtained from ground baddeleyite by acid treatment or partial chlorination. The method involves adding a colloidal suspension of hydrated zirconium oxide in an amount of 0.1 to 2% by weight of hydrated zirconium oxide relative to the zirconium oxide to be purified at a pH value of less than 3 to an aqueous suspension of the zirconium oxide. If necessary, the mixture may be agitated for 2 to 10 hours at increased temperatures, preferably from 60° to 100° C. Subsequently, the zirconium oxide is recovered by depositing which may, if necessary, be repeated several times and then decanting and subsequent drying.

This method is different from the present method since solutions which contain the basic zirconyl ion are not used. Rather, colloidal suspensions of hydrated zirconium oxide are used and increased temperatures are required, i.e., temperatures in a range to insure that the hydrated zirconium oxide is present in the insoluble state. Accordingly, this method relates exclusively to absorptive reactions on the surface of the colloidally suspended hydrated zirconium oxide. Accordingly, in the known method, only very small amounts of foreign substances are adsorbed whereas in the present method, far greater amounts of a fraction to be separated are brought into a stable suspension.

The inventive method shall be explained in more detail with the aid of the following examples

EXAMPLE 1

1000 g of finely ground baddeleyite concentrate having a specific surface area of 3300 $cm^2g^{-1}$ and a $P_2O_5$ content of 0.03 are intensively agitated at room temperature for 2 to 3 hours in a solution of 20 g zirconium oxychloride in 2 l of water. After standing for 8 to 10 hours, a milky white suspension is poured off from the sediment. It is then filled up with fresh water to the original liquid volume and intensively agitated for another 2 to 3 hours. Again, after 8 to 10 hours of standing, a white suspension can be decanted from the sediment.

The combined suspensions are precipitated with 10 to 20 ml concentrated, aqueous ammonia and the precipitate is filtered and dried at approximately 100° to 120° C. 44 g of a material are obtained which contains the basic phosphates of the polyvalent ions of the zirconium, iron, aluminum, etc., in enriched form, specifically with a $P_2O_5$ content of 0.68%.

After filtering and drying at 100° to 120° C., 964 g of finely ground baddeleyite concentrate are obtained from the sediment. The content of $(Zr,Hf)O_2$ has increased from, originally, 99.2% to 99.6% and the phosphate content is now only 0.004% $P_2O_5$.

EXAMPLE 2

As the starting material, a magnetite-cerite ore from Mount Pilanes (Transvaal) is used. This ore has the following analysis: The entire iron content was determined to be $Fe_2O_3$.

| | |
|---|---|
| $Fe_2O_3$ | 36.7 |
| Oxides of the rare earths | 35.8 |
| $ThO_2$ | 4.1 |
| $P_2O_5$ | 6.2 |
| $SiO_2$ | 4.3 |
| Losses from glowing at 900° C. | 4.9 |

The remainder consists mainly of alkaline earth oxides and alumina. The specific radioactivity is 12800 $pCig^{-1}$ $\alpha$— and 12400 $pCig^{-1}$ $\beta$-radiation.

The ore is comminuted and ground wet in a ball mill to a very fine powder having a specific surface area of approximately 6000 $cm^2g^{-1}$. 1000 g of the finely ground ore are intensively agitated at room temperature for approximately 3 hours in 2 liter of water with the addition of 15 g of zirconium oxychloride and 1 ml concentrated hydrochloric acid and the mixture is allowed to stand. After 60 to 75 minutes, the loamcolored suspension is poured off from the black sediment. Water is added to the black sediment until the original liquid volume is reached again. It is then intensively agitated for another 15 minutes. After a standing period of 20 to 30 minutes, the loam-colored suspension is again poured off from the black sediment.

The two suspensions are combined. By adding 8 to 12 ml of concentrated aqueous ammonia until an alkaline reaction takes place, the suspension coagulates to a mass which can be easily filtered. The filtered and washed sediment yields, after drying, 656 g of a rare earth concentrate containing 51.7% oxides of the rare earths, 6.1% $ThO_2$, 5.8% $SiO_2$, 8.7% $P_2O_5$ and 3.8% $Fe_2O_3$. The concentrate has a specific radioactivity of 19900 $pCig^{-1}$ $\alpha$-radiation and 18000 $pCig^{-1}$ $\beta$-radiation.

The black sediment yields, after drying, 348 g of a magnetite concentrate having an iron content, computed as $Fe_2O_3$, of 92.8%, 1.8% oxides of the rare earths, 0.21% $ThO_2$, 1.3% $SiO_2$ and 0.5% $P_2O_5$. The specific radioactivity is 970 $pCig^{-1}$ $\alpha$-radiation and 900 $pCig^{-1}$ $\beta$-radiaton.

What is claimed is:

1. A method for separating a given fraction from a mixture of fine particles which are insoluble in water which fraction has a surface which is more chemically reactive than the remaining fractions and which produces a suspension having a pH of no more than 6 when suspended in water which comprises:

(a) grinding the mixture until the fraction to be separated has a particle size of less than about 50 microns;

(b) suspending the ground material at a temperature below 100° C. in a diluted aqueous solution of about 0.3 to 3% by weight based on the fraction to be separated of zirconium oxychloride or zirconium oxynitrate;

(c) separating the suspension from sediment therein by decantation; and (d) adding a base to the separated suspension in an amount sufficient to precipitate the given fraction.

2. The method of claim 1 wherein the decantation step is repeated at least once.

3. The method of claim 1 wherein the precipitate is filtered, washed and dried.

4. The method of claim 1 wherein the base is ammonia.

5. The method of claim 1 wherein the mixture is ground until the fraction to be separated has a particle size of less than about 20 microns.

6. A method for separating a given fraction from a mixture of fine particles which are insoluble in water which fraction has a surface which is more chemically reactive than the remaining fractions and which produces an alkaline suspension when suspended in water, which comprises:

(a) grinding the mixture until the fraction to be separated has a particle size of less than about 50 microns;

(b) suspending the ground material at a temperature below 100° C. in a diluted aqueous solution of about 0.3 to 3% by weight based on the fraction to be separated of zirconium oxychloride or zirconium oxynitrate;

(c) while adding to the suspension an acid corresponding to the ionic part of the zirconium compound used to adjust the pH to 2 to 6;

(d) separating the suspension from sediment therein by decantation; and (e) adding a base to the separated suspension in an amount sufficient to precipitate the given fraction.

7. The method of claim 6 wherein the decantation step is repeated at least once.

8. The method of claim 6 wherein the precipitate is filtered, washed and dried.

9. The method of claim 6 wherein the base is ammonia.

10. The method of claim 6 wherein the mixture is ground until the fraction to be separated has a particle size of less than about 20 microns.

* * * * *